United States Patent
Taghizadeh Kaschani et al.

(10) Patent No.: US 12,294,211 B2
(45) Date of Patent: May 6, 2025

(54) INTEGRATED CIRCUIT WITH ELECTROSTATIC DISCHARGE PROTECTED POWER SUPPLY

(71) Applicant: Texas Instruments Incorporated, Dallas, TX (US)

(72) Inventors: Karim Thomas Taghizadeh Kaschani, Freising (BY); Michael Lüders, Inzell (DE); Cetin Kaya, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/704,205

(22) Filed: Mar. 25, 2022

(65) Prior Publication Data

US 2022/0311242 A1    Sep. 29, 2022

Related U.S. Application Data

(60) Provisional application No. 63/165,867, filed on Mar. 25, 2021.

(51) Int. Cl.
*H02H 9/02* (2006.01)
*H02H 9/00* (2006.01)

(52) U.S. Cl.
CPC .............. *H02H 9/005* (2013.01); *H02H 9/02* (2013.01)

(58) Field of Classification Search
CPC ............ H02H 9/04; H02H 9/00; H02H 9/046; H02H 9/005; H02H 9/041; H02H 9/02; H02H 9/06; H02H 3/22; H01L 27/0266

USPC .......................................................... 361/56
See application file for complete search history.

(56) References Cited

U.S. PATENT DOCUMENTS

| | | | | |
|---|---|---|---|---|
| 5,946,177 A | * | 8/1999 | Miller | H01L 27/0248 361/56 |
| 2009/0154035 A1 | * | 6/2009 | Galvano | H02H 9/046 361/56 |
| 2009/0197377 A1 | * | 8/2009 | Chalamala | H01L 27/0285 438/231 |
| 2010/0157491 A1 | * | 6/2010 | Hong | H03K 17/08122 361/56 |
| 2014/0198415 A1 | * | 7/2014 | Schulmeyer | H02H 9/046 361/56 |
| 2017/0244244 A1 | * | 8/2017 | Ikeda | H01L 29/744 |
| 2018/0026440 A1 | * | 1/2018 | Zhao | H02H 9/041 361/56 |
| 2021/0313801 A1 | * | 10/2021 | Albertini | H03K 3/017 |

* cited by examiner

*Primary Examiner* — Danny Nguyen
(74) *Attorney, Agent, or Firm* — Andrew R. Ralston; Frank D. Cimino (57) ABSTRACT

An IC, comprising a first rail supply, a second rail supply, an external pad coupled to one of the first rail supply and the second rail supply, and an ESD protection circuit coupled to the external pad. The ESD protection circuit includes a slew rate detector coupled to the external pad, an amplifier coupled to an output of the slew rate detector, a one-shot coupled to an output of the amplifier, and a clamp circuit coupled an output of the one-shot.

18 Claims, 8 Drawing Sheets

INTEGRATED CIRCUIT WITH ELECTROSTATIC DISCHARGE PROTECTED POWER SUPPLY

CROSS-REFERENCE TO RELATED APPLICATION

This application claims the benefit of and priority to U.S. Provisional Application No. 63/165,867, filed Mar. 25, 2021, which is hereby fully incorporated herein by reference.

BACKGROUND

The examples relate to an integrated circuit (IC) with an electrostatic discharge (ESD) protected power supply.

ESD is the sudden flow of electricity between two objects as electrical charge transfers from one of the objects to the other. For integrated circuit (IC) durability and longevity, ESD protection is included and applied to an IC circuit or IC node(s). In the event of an ESD pulse (strike), ESD protection redirects current to a path, such as away from the IC, that can manage the ESD charge and thereby prevent damage that otherwise could occur were the strike received by an IC signal path. When an ESD strike is not occurring, ideally the ESD protection circuit does not affect IC operation.

Certain ICs implement structures that are susceptible to ESD events, where for example such structures include pads exposed to the outside of the IC package. Such ICs may include ESD protection, including circuitry that seeks to detect, and is triggered, when an ESD event occurs, where the triggering may be in response to a signal level or a signal slew rate. The HBM model (human body model) defines a range of ESD events differing in the amplitude and the ramp-rate. The slew-rate triggered ESD circuit must be designed to trigger under all conditions to ensure ESD protection. At the same time, some applications have other design considerations that may complicate the goal of properly triggering in response to an ESD event, while avoiding a mistaken triggering during an expected nominal operation of the device. For example, the bootstrap supply in a half-bridge configuration demand fast supply power-up, which typically implies also a small bypass capacitance. However, too fast of a power-up could be potentially triggering if detected by ESD circuitry as a slew-rate exceeding ESD event. Conversely, a larger bypass capacitor naturally limits the maximum supply slew-rate under application conditions, but may be contrary to the desired start-up speed.

Accordingly, there may be a need or desire to provide ESD protection to such a pad(s), while also responding to other considerations pertaining to the IC. This document provides examples that may improve on certain of the above concepts, as detailed below.

SUMMARY

In one example, there is an IC, comprising a first rail supply, a second rail supply, an external pad coupled to one of the first rail supply and the second rail supply, and an ESD protection circuit coupled to the external pad. The ESD protection circuit includes a slew rate detector coupled to the external pad, an amplifier coupled to an output of the slew rate detector, a one-shot coupled to an output of the amplifier, and a clamp circuit coupled an output of the one-shot.

Other aspects and examples are also disclosed and claimed.

DETAILED DESCRIPTION

Circuit examples are illustrated and described that include an IC with an ESD protected power supply. The examples are not intended to be exhaustive, as various concepts described in this document may apply to different applications. For example, one application is where an IC includes a power supply rail coupled to a pin exposed outside the IC package, for example for coupling to bypass capacitance, and that pin may introduce an ESD signal into the IC. Further, the typical operation of the IC, for example during startup, may involve a relatively fast change in voltage at the rail. In these instances, selective and accurate ESD protection cells are implemented so that normal startup, with its corresponding fast voltage change, is permitted to occur, without triggering the ESD protection, while in contrast the ESD protection otherwise triggers, and shunts the ESD event, when the rail experiences a voltage increase that is likely to represent an ESD event, as opposed to the normal IC startup or other power supply rail conditions.

Some baseline ESD protection circuits use large diode structures designed to break down under ESD conditions to reduce damage to a protected circuit. Such diodes may experience snap-back behavior, which can degrade or damage the diode. Such protection circuits may provide one or more of a static trigger, a snap-back behavior, and a dV/dt-triggered active clamp as a feature of ESD protection, and may be inadvertently triggered by transient signals or noise on a protected node.

Various examples of the disclosure provide active ESD-protection solutions that avoid at least some of the undesirable characteristics of such baseline implementations. Such examples may be beneficially applied to circuit implementations in which switching transients are common and might otherwise trigger baseline ESD protection devices. Various described examples limit an ESD overvoltage on IC power terminals to less than an absolute maximum rating (AMR) of those terminals without triggering ESD suppression during a fast power-up of the device. Some examples further eliminate the need for disabling the ESD suppression circuit during power-up by discriminating between an ESD-related voltage slew rate (dV/dt) and a power-up slew rate on a protected node. Some examples provide for disabling ESD protection after circuit startup to prevent inadvertent triggering of ESD protection in a noisy circuit environment such as a switching power supply.

Without limitation, in some examples if a voltage slew rate on a protected node such as a device input terminal exceeds a predetermined value, a signal derived from the protected node voltage is amplified and sampled, for example by charging a charge storage net for a short time, for example tens of nanoseconds. The stored charge is held for a duration commensurate with the duration of an HBM ESD event, for example a few microseconds. One or more discharge transistors is turned on to provide a low-resistance path from the protected node to a current sink of the protected circuit. A relatively small transistor may be turned on to dissipate the charge resulting from a relatively small (low-stress) ESD event, for example tens of volts, while a relatively large transistor may be alternatively or additionally turned on to dissipate the charge resulting from a relatively large (high-stress) ESD event, for example a few kV.

Figure 1:
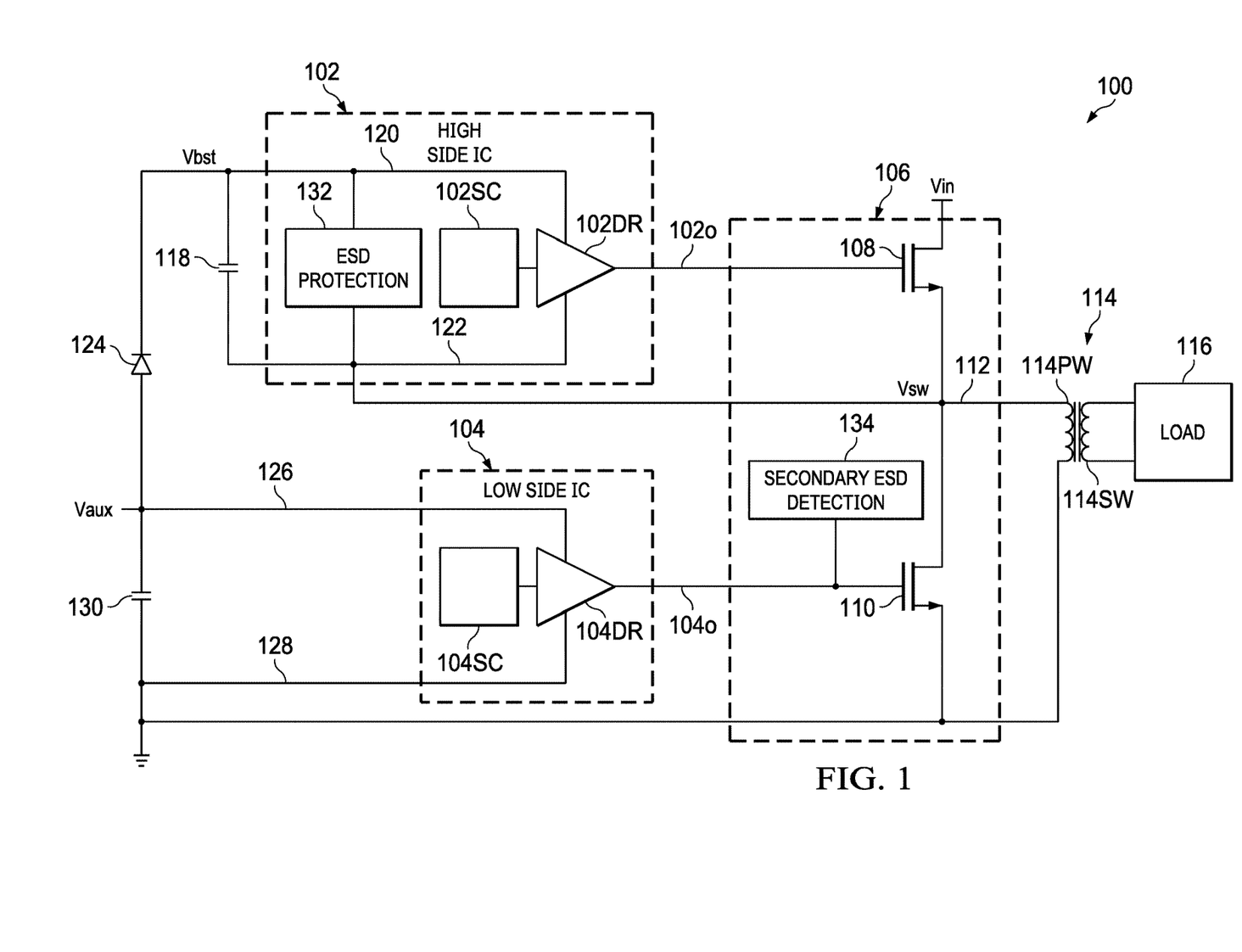
FIG. 1 illustrates an electrical diagram of an example ESD protected system.

FIG. 1 illustrates an electrical diagram of an example half-bridge power stage 100, which is ESD protected and is illustrative, but not exhaustive, of an implementation as introduced above. The half-bridge power stage 100 includes a high-side IC 102 and a low-side IC 104, where "high-side" and "low-side" are terms in the art typically identifying the relative connection of the high-side to a power supply and the low-side relative to ground, and where collectively the sides drive a load. While shown and described in the present example as being implemented by two ICs, the functionality of the high-side IC 102 and the low-side IC 104 may in some examples be provided by a single IC formed on a single common substrate. In FIG. 1, the high-side IC 102 and the low-side IC 104 each include a respective driver 102DR and 104DR, and collectively those drivers 102DR and 104DR drive a power transistor stage 106. The power transistor stage 106 includes, for example, a high-side power transistor 108 and a low-side power transistor 110, each of which may be a separate die or may be formed on a common die. Each of the high-side and low-side power transistors 108 and 110 has a gate connected to a respective output 102o and 104o of the high-side IC 102 and the low-side IC 104. The drain of the high-side power transistor 108 is connected to an input voltage Vin. The source of the high-side power transistor 108 is connected to the drain of the low-side power transistor 110, and that connection provides a power transistor stage output 112, which provides a switching voltage $V_{SW}$. The power transistor stage output 112, which may be referred to as a "power output," is connected to a first terminal of a primary winding 114PW of a transformer 114, and a second terminal of the primary winding 114PW is connected to ground. A load 116 is connected between a first terminal and a second terminal of the secondary winding 114SW of the transformer 114.

In an example, the high-side IC 102 and the low-side IC 104 are connected in a half-bridge configuration, wherein startup power to the high-side driver 102DR is supplied by bootstrapping. As a half-bridge, the switching paths of the high-side IC 102 and the low-side IC 104 are generally complementary, that is, only one conducts at a time so as to alternately enable output by a respective one of the high-side and low-side power transistors 108 and 110. As a bootstrapped system, a bootstrap capacitor 118 is connected between rails of the high-side IC 102, namely with a first terminal (e.g., a bottom plate) connected to a second input 122 and a second terminal (e.g., a top plate) connected to a first input 120, sometimes referred to as a protected node. Each of the first input 120 and second input 122 may be electrically connected to a bond pad (not shown), terminal, or similar I/O structure of a device die. The first terminal of the bootstrap capacitor 118 is also connected to the power transistor stage output 112. In one example as shown, the bootstrap capacitor 118 may be external from the high-side IC 102, while in an alternative example it may be internally integrated within the high-side IC 102. In an example, the capacitance of the bootstrap capacitor 118 is relatively low (e.g., 10 nF or less), so as to minimize delay at startup of the overall architecture. The anode of a diode 124 is connected to a first input 126 of the low-side IC 104, and the cathode of the diode 124 is connected to the second terminal (top plate) of the bootstrap capacitor 118 and to the first input 120 of the high-side IC 102. The diode 124 also may be internally integrated within the high-side IC 102, either without the bootstrap capacitor 118 being integrated, or both of the devices may be so integrated. The first input 126 of the low-side IC 104 is also connected to receive an auxiliary voltage Vaux. Vaux may be the same or a different voltage level as Vin, where in one example both may equal 30 V, although considerably higher voltage levels also may be used, for example particularly with respect to Vin (e.g., up to 650 V or higher). A second input 128 to the low-side IC 104 is connected to a power rail having a relatively low potential (e.g., ground), the source of the low-side power transistor 110, and to a second terminal of the primary winding 114PW. A decoupling capacitor 130 is connected between the first input 126 and the second input 128 of the low-side IC 104. Each of the first input 126 and second input 128 may be electrically connected to a bond pad (not shown), terminal, or similar I/O structure of a device die.

The half-bridge power stage 100 also includes a bootstrap ESD protection circuit 132. In an example, the bootstrap ESD protection circuit 132 is integrated as part of the high-side IC 102 and is coupled between the first input 120 and the second input 122, and consequently between the first and second terminal of the bootstrap capacitor 118. Accordingly, the bootstrap ESD protection circuit 132 can provide a shunt across the bootstrap capacitor 118 and thereby protect the high-side IC 102 from some ESD events. An ESD event to the first input 120 may be tens of volts to kilovolts. An ESD event in a range from tens of volts to a few hundred volts is regarded as a "low-stress" event, an ESD event in a range from a few hundred volts to about a kilovolt is regarded as a "medium-stress" event, and an ESD event greater than a kilovolt is regarded as a "high-stress" event. In an example, the shunt further includes a path to ground through the low-side power transistor 110, which may act as a current sink. Accordingly, the half-bridge power stage 100 further includes a secondary ESD detection circuit 134, which may include a dedicated trigger circuit that can enable the low-side power transistor 110 in response to certain ESD events, for example for an ESD surge between the first input 120 and ground or between the power transistor stage output 112 and ground. Accordingly, the secondary ESD detection circuit 134 may be connected to sense a voltage at one or more nodes (not explicitly shown) and, if an ESD pulse is detected at one or more of the monitored nodes, the secondary ESD detection circuit 134 directs an enable signal to the low-side power transistor 110 to form a conductive path between the power transistor stage output 112 and ground in response to the event. Still other ESD protection may be included in other portions of the half-bridge power stage 100 (e.g., within, or coupled to one or more pads, of any IC), but such implementations are beyond the scope of this disclosure.

The typical operation of the half-bridge power stage 100 is now introduced. Generally, the operation toggles between two cycles as may be controlled by respective switching circuits 102SC and 104SC of the high-side IC 102 and the low-side IC 104. Part or all of the switching circuits 102SC and 104SC may be implemented (e.g., including pulse width modulators) or controlled either internally or externally relative to the respective IC. Further, each of the switching circuits 102SC and 104SC enables the respective driver 102DR and 104DR, in alternating respective cycles, to provide a signal to the respective output 102o and 104o. For example, in a first cycle, the switching circuit 104SC enables the driver 104DR, which is biased between Vaux and ground, while during the first cycle the high-side driver 102DR is not enabled. In response to being enabled by the switching circuit 104SC, the driver 104DR outputs an enabling signal to the output 104o. The enabling signal is coupled to the gate of the low-side power transistor 110, thereby causing it to conduct and connecting the power transistor stage output 112 to ground through the source/drain path of the low-side power transistor 110, causing $V_{SW}$ to have a ground potential. At the same time, Vaux forward-biases the diode 124 and provides a bootstrap voltage Vbst to the first input 120 of the high-side IC 102, which charges the bootstrap capacitor 118 at a voltage of Vaux, minus the forward bias voltage drop across the diode 124 and $V_{SW}$. The bootstrap voltage Vbst may be referred to herein as a charging voltage. In a second cycle, the switching circuit 102SC enables the driver 102DR, the driver 102DR being biased by the voltage across the bootstrap capacitor 118, plus the voltage Vin (minus the voltage drop across the high-side power transistor 108). Accordingly, the nominal value of Vaux to the driver 102DR is augmented (boosted) by the Vbst voltage that was stored during the first cycle across the bootstrap capacitor 118, thereby providing a robust driving gate voltage to the high-side power transistor 108 greater than its source voltage (at the power transistor stage output 112). The augmented voltage may be referred to a "boost voltage." Accordingly, the high-side power transistor 108 is fully enabled to provide Vin to $V_{SW}$, at the power transistor stage output 112. The boost voltage (minus any loss across the high-side power transistor 108) is thereby provided to the transformer 114, which in turn drives the load 116. Thereafter, the above first cycle and second cycle alternate indefinitely, so as to continue to drive the load 116.

The above-described typical operation occurs so long as no ESD strike occurs. With the addition of the bootstrap capacitor 118, there is introduced the possibility of an ESD strike to one (e.g., the top plate) or both of the capacitor terminals, to the extent either is exposed outside the IC package. When an ESD strike occurs that charges, for example the top plate of the bootstrap capacitor 118, the voltage at that location (also shown as the first input 120) rises, and the bootstrap ESD protection circuit 132 triggers and limits the maximum voltage between the first input 120 and the second input 122.

Figure 2:
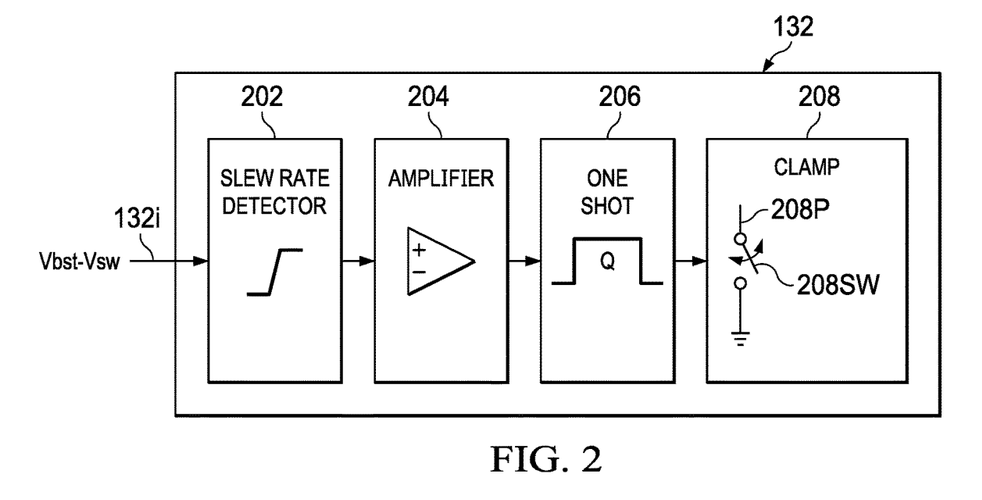
FIG. 2 illustrates a block diagram of the FIG. 1 bootstrap ESD protection circuit.

FIG. 2 illustrates a block diagram of the FIG. 1 bootstrap ESD protection circuit 132. Functionally in an example, the bootstrap ESD protection circuit 132 includes four stages, which as described later may be implemented with separate or shared circuit elements. Each stage is first introduced here, with FIG. 4 later providing a contextual implementation. The bootstrap ESD protection circuit 132 samples a voltage differential, shown in the present FIG. 1 example as Vbst-$V_{SW}$. The sampled voltage differential is connected to a slew rate detector 202, which provides a signal that is responsive to (including representative of) the rate at which the differential input signal changes. The output of the slew rate detector 202 is connected to an amplifier 204. The amplifier 204 amplifies the slew rate representation signal, so as to more quickly elevate that signal to a level sufficient to change state of one or more circuits (e.g., transistors) to which the amplified signal is provided. The output of the amplifier 204 is connected to a one-shot circuit 206. If the amplified signal reaches a sufficient level, it triggers the one-shot circuit 206 to output an asserted data signal pulse (e.g., at an output Q) that is high for a duration as established by its circuit components. Lastly, the one-shot circuit 206 output is connected to selectively open or close a switch of clamp circuit 208, that is, the clamp circuit 208 includes a conductive path configured to be selectively opened and closed, shown schematically in FIG. 2 as a switch 208SW that can discharge to a reference potential, such as ground. The switch 208SW includes a pole 208P connected to a signal node at which an ESD strike can occur, such as the bootstrap capacitor 118 second terminal connected to the first input 120 in FIG. 1. Accordingly, if the one-shot circuit 206 outputs an asserted signal, the switch 208SW closes for the duration of the asserted signal. Once the one-shot circuit 206 output signal is no longer asserted, the switch 208SW opens.

Figure 3:
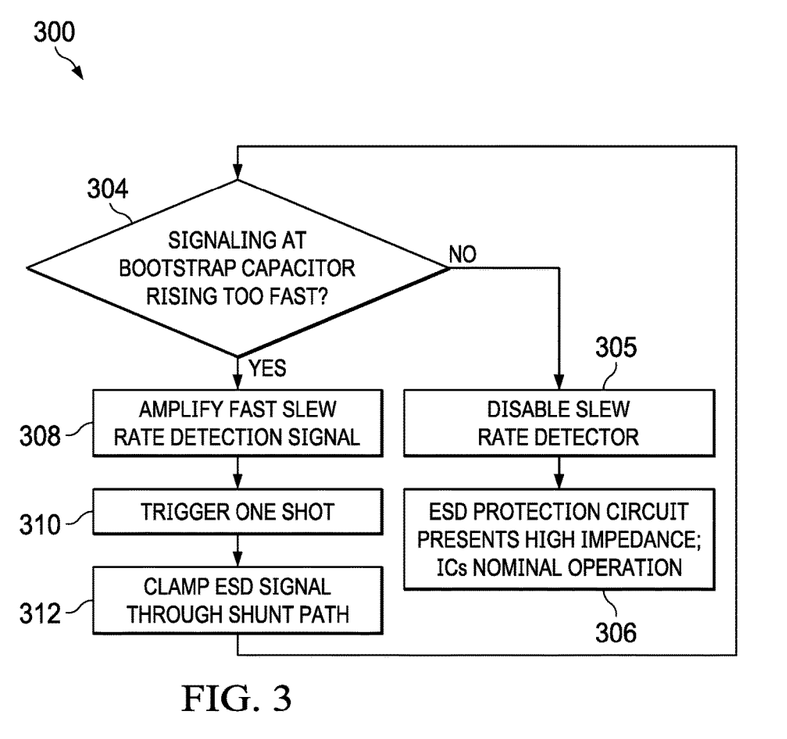
FIG. 3 illustrates a flowchart of an operational method 300 of the FIG. 1 ESD protected system.

FIG. 3 illustrates a flowchart of an operational method 300 of the FIG. 1 half-bridge power stage 100, including the bootstrap ESD protection circuit 132. A loop including states 304/308/310/312 may operate to protect a circuit when unpowered, as the ESD protection circuit 132 may be powered by an ESD event. The responsive bootstrap ESD protection circuit 132 operation, that is whether an ESD shunt is triggered, depends on a conditional step 304. The conditional step 304 is conditioned on whether the signal at the bootstrap capacitor 118 is rising too fast compared to a slew rate limit, as evaluated by the FIG. 2 slew rate detector 202. For example, under normal operating conditions of the high and low-side ICs 102 and 104, Vbst will be expected to ascend at a given rate (e.g., 35 V/µs), Accordingly, the step 304 slew rate conditional limit may be set, for example, at a limit of a multiple (e.g., times two) of the normal expected rate (e.g., 2*35 V/µs=70 V/µs). If Vbst rises at a rate within nominal levels, that is below the step 304 limit (e.g., 70 V/µs), then the method 300 proceeds from step 304 to a step 306. Conversely, if Vbst rises at a rate above nominal levels, for example at a rate twice or higher than the expected rise rate, then the method 300 proceeds from the step 304 to a step 308, from where a sequence of successive events implement an ESD shunt of the relatively quickly-ascending Vbst signal.

Step 306 is reached when the Vbst signal is within nominal levels, that is, not rising at a rate faster than the step 304 limit Such a condition may be consistent with operation of a protected circuit, such as the half-bridge power stage 100. In this circumstance it may be desirable to disable the bootstrap ESD protection circuit 132 to prevent being triggered by switching noise on power supply nodes. Thus in a step 305 the slew rate detector 202 may be disabled to prevent further operation of the ESD protection circuit 132 until power is removed from the protected circuit, at which point the step 304 becomes operative again. In response to disabling the slew rate detector 202, the bootstrap ESD protection circuit 132 presents a relatively high impedance, in parallel to the bootstrap capacitor 118. Accordingly, negligible or no current flows through the bootstrap ESD protection circuit 132, and the operation of the bootstrap capacitor 118 is undisturbed by the ESD protection. Further, the bootstrap ESD protection circuit 132 does not provide a low resistance conductive path to shunt any charge during the step 306, so the high-side IC 102 and the low-side IC 104 operate according to nominal parameters and functions and without material impact from the bootstrap ESD protection circuit 132.

If the bootstrap capacitor voltage is determined to be rising faster than the slew rate conditional limit at the step 304, then the method 300 advances to step 308, and the steps 310 and 312 following it. The steps 306, 310, and 312 represent the operations of the FIG. 2 amplifier 204, one-shot 206, and clamp circuit 208, respectively, which occur when Vbst rises too rapidly per the step 304 condition. Specifically, when such a signal rise occurs, the signal rise is attributed to an ESD strike, and the steps 308, 310, and 312 collectively combine to shunt the fast-rising Vbst signal. After operating to shunt the ESD current, the method 300 returns to the decision step 304 to continue protecting the half-bridge power stage 100 circuit. Additional possible implementation details in connection with each of these steps are further discussed in connection with FIG. 4, below.

Figure 4:
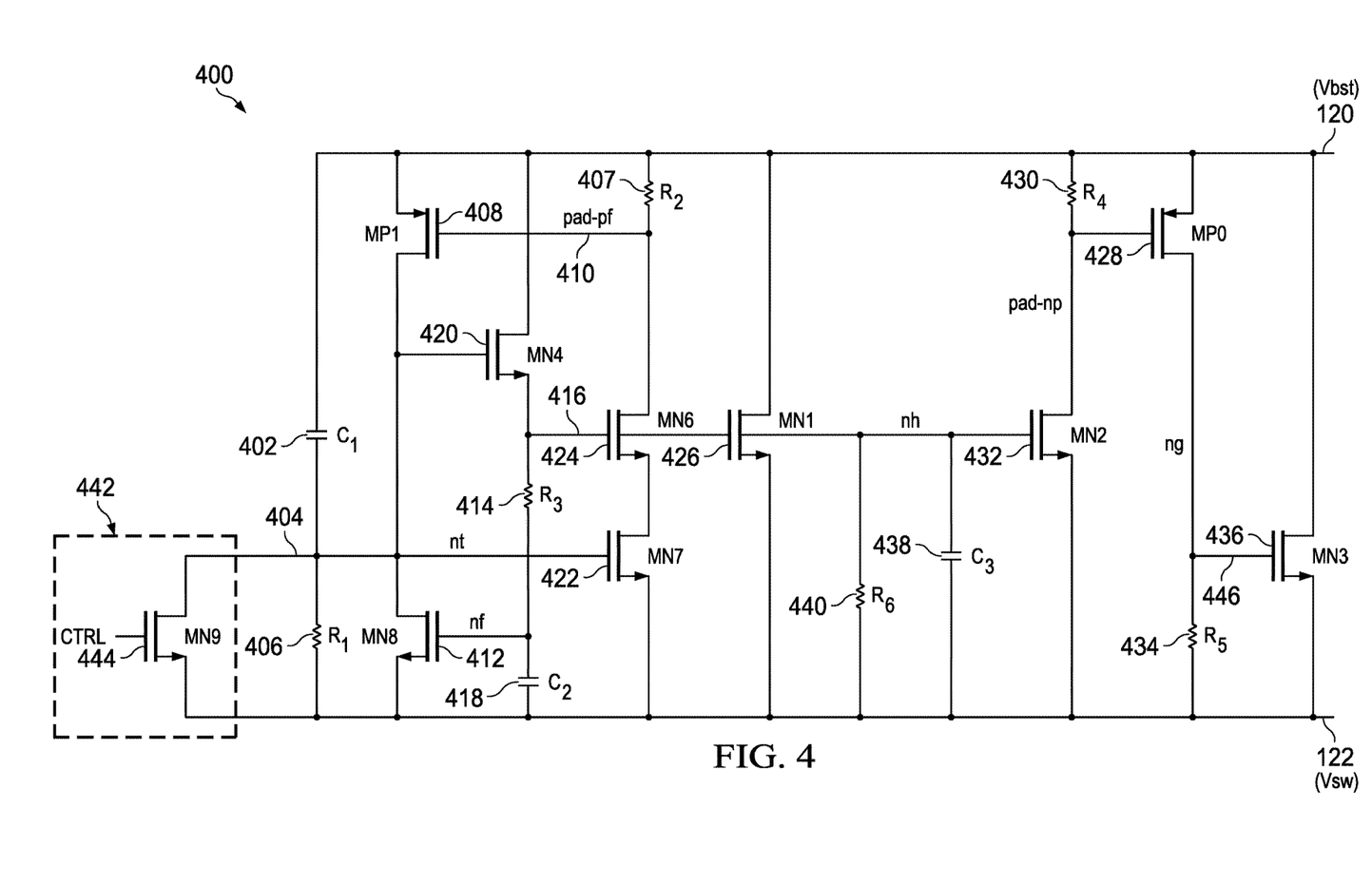
FIG. 4 illustrates a schematic diagram of a circuit implementation of an example of the FIGS. 1 and 2 bootstrap ESD protection circuit.

FIG. 4 illustrates a schematic of a circuit 400 that may implement the bootstrap ESD protection circuit 132 of FIGS. 1 and 2 according to some examples. The circuit 400 is only by example and only certain components are shown so as to simplify the illustration, while other components and connections may be included, added, or substituted by one skilled in the art given the teachings of the disclosure. Generally, circuit 400 components are connected between the first input 120 and the second input 122 of the high-side IC 102, the first and second inputs 120, 122 having voltages Vbst and $V_{SW}$, respectively. In the following discussion, portions of the circuit 400 are shown in isolation for clarity.

Figure 4A:
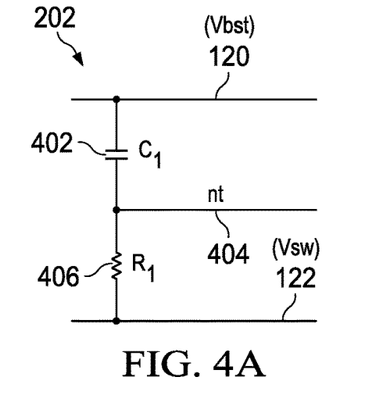
FIG. 4A illustrates operation of a portion of the schematic of FIG. 4 that may detect a high slew-rate of an ESD stress to input terminal.

FIG. 4A illustrates a first capacitor 402 ($C_1$) and a first resistor 406 ($R_1$) as a non-limiting example of the slew rate detector 202. The first capacitor 402 is connected between the first input 120 and a first node 404, also designated net_nt and sometimes referred to as a sample node. The first resistor 406 is connected between the first node 404 and the second input 122. Thus the first capacitor 402 and first resistor 406 are an example of a high-pass filter that provides a time-dependent signal to the node 404 in response to a change of Vbst. In an example, the capacitance of the first capacitor 402 and the resistance of the first resistor 406 are together selected so that the RC time constant T, which is the product of $R_1$ and $C_1$, provides a predetermined time period that distinguishes between a relatively fast slew rate that is characteristic of an ESD event and a relatively slow slew rate characteristic of normal operation, such as powering up or operating the circuit 400. Operation of the components of FIG. 4A is described below.

Figure 4B:
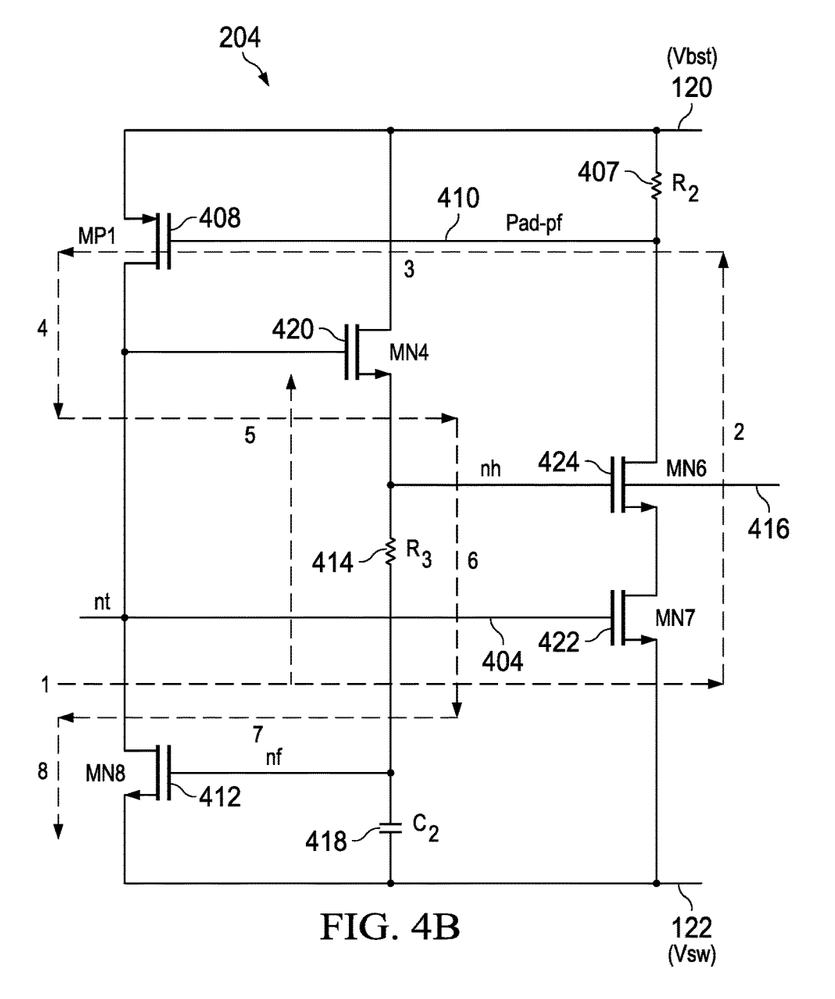
FIG. 4B illustrates operation of a portion of the schematic of FIG. 4 that may boost a dV/dt signal related to an ESD stress to a power rail.

FIG. 4B illustrates components that in a non-limiting example may implement operation of the amplifier 204. A first PMOS transistor 408 (MP1) has its source connected to the first input 120 and its gate connected to a second node 410, also sometimes referred to as node_Pad-pf. The gate is also connected through a second resistor 407 ($R_2$) to the first input 120. The drain of the first PMOS transistor 408 is connected to the first node 404 (net_nt). The first node 404 is also connected to a drain of a first NMOS transistor 412 (MN8), which has its source connected to the second input 122. The gate of the first NMOS transistor 412 is connected through a third resistor 414 ($R_3$) to a third node 416 (net_nh) and through a second capacitor 418 ($C_2$) to the second input 122. The third node 416, sometimes described as a hold node, is also connected to the source of a second NMOS transistor 420 (MN4), which has its drain connected to the first input 120 and its gate connected to the first node 404. The first node 404 is further connected to the gate of a third NMOS transistor 422 (MN7). The source of the third NMOS transistor 422 is connected to the second input 122, and its drain is connected to a source of a fourth NMOS transistor 424 (MN6). The gate of the fourth NMOS transistor 424 is connected to the third node 416, and the drain of the fourth NMOS transistor 424 is connected to the second node 410. Operation of the components of FIG. 4B is described more fully below.

Figure 4C:
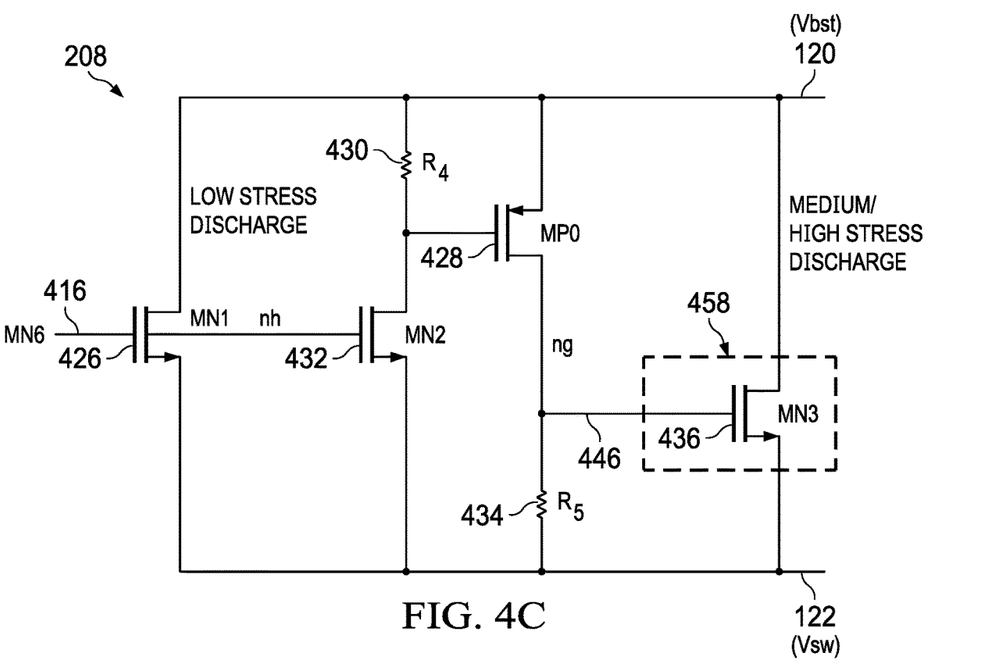
FIG. 4C illustrates operation of a portion of the schematic of FIG. 4 that may operate to clamp a voltage on an input terminal.

FIG. 4C illustrates components that in a non-limiting example may implement operation of the clamp circuit 208. A gate of a fifth NMOS transistor 426 (MN1) is connected to the third node 416 (net_nh). A drain of the fifth NMOS transistor 426 is connected to the first input 120, and a source of the fifth NMOS transistor 426 is connected to the second input 122. A source of a second PMOS transistor 428 (MP0) is connected to the first input 120, and a gate of the second PMOS transistor 428 is connected through a fourth resistor 430 ($R_4$) to the first input 120, and to the drain of a sixth NMOS transistor 432 (MN2). A source of the sixth NMOS transistor 432 is connected to the second input 122. A drain of the second PMOS transistor 428 is connected at a fourth node 446 (net ng) to a first terminal of a fifth resistor 434 ($R_5$). A second terminal of the fifth transistor 434 is connected to the second input 122. A gate of a seventh NMOS transistor 436 (MN3) receives the signal from the fourth node 446. The drain of the seventh NMOS transistor 436 is connected to the first input 120 and its source is connected to the second input 122. Operation of the components of FIG. 4C is described more fully below.

Figure 4D:
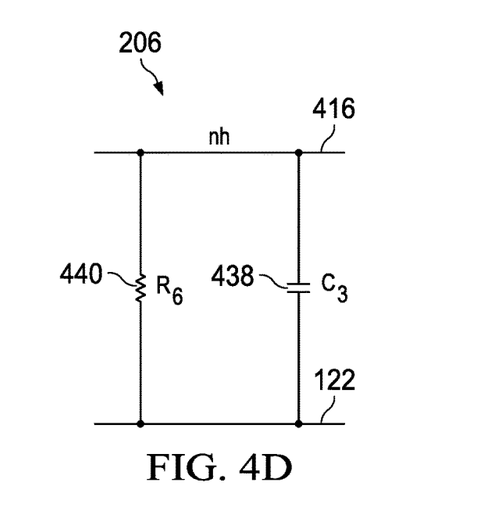
FIG. 4D illustrates operation of a portion of the schematic of FIG. 4 that may operate to activate the clamp of FIG. 4C for a predetermined duration upon the occurrence of an ESD event at an input terminal.

FIG. 4D illustrates components that in a non-limiting example may implement operation of the one-shot 206 in cooperation with the clamp circuit 208. A third capacitor 438 ($C_3$) and a sixth resistor 440 ($R_6$) are connected in parallel between the third node 416 and the second input 122, forming an RC circuit. When charged by the third node 416 (net_nh), the capacitor 438 may discharge at a rate determined by the respective resistance and capacitance of the third capacitor 438 and the sixth resistor 440. Thus the third capacitor 438 can maintain a voltage on the net_nh for a period of time determined by the time constant of the RC circuit to enable the NMOS transistors 426 and 432 (FIG. 4C). Operation of the components of FIG. 4D is described more fully below.

Concluding the structure of FIG. 4, in an example, an optional slew rate disabling circuit 442 also may be included, so as to override the function of the FIG. 2 slew rate detector 202. For example, the ESD protection may be used during material handling prior to start-up. So once start-up is complete and the half-bridge power stage 100 is providing a stable power supply (e.g., to the FIG. 1 load 116), a control signal CTRL may be asserted to the slew rate disabling circuit 442, thereby disabling the bootstrap ESD protection circuit 132. In an example, the slew rate disabling circuit 442 is implemented by an eighth NMOS transistor 444 (MN9), with its drain connected to the first node 404, its source connected to the second input 122, and its gate connected to receive the CTRL signal. Accordingly, when the CTRL signal is asserted (active high), the eighth NMOS transistor 444 source/drain path shorts together the terminals of the first resistor 406, thereby preventing it from charging and likewise preventing a triggering of the remaining functionality, including clamping functionality, of the bootstrap ESD protection circuit 132.

The operation of the protection circuit 132 as exemplified by the circuit 400 is now further described, with different portions described to generally align with, and further illustrate an example of, the earlier-described discussions of FIG. 2 and FIG. 4. The following narrative may overlap and augment the previous discussions.

Referring to FIG. 4A, the first capacitor 402 and the first resistor 406 act as a high-pass filter of the Vbst at the first input 120, with a frequency breakpoint at $\omega_B=1/\tau$. If the slew rate of a voltage transient on Vbst is relatively slow compared to $\omega_B$ (e.g., low-frequency), then the transient is filtered and the voltage at the first node 404 (net_nt) remains relatively low; as a result, that voltage, coupled as shown in FIGS. 4 and 4B to the gates of the second and third NMOS transistors 420 and 422, will not exceed the turn-on voltage of the second NMOS transistor 420 and the third NMOS transistor 422, so paths that may be enabled by those transistors in the circuit 400 remain inactive. On the contrary, if the slew rate of the voltage at the first input 120 rises relatively quickly, e.g. has sufficient spectral energy at frequencies greater than $\omega_B$, then the voltage at the first node 404 may exceed the turn-on voltage of the second NMOS transistor 420 and the third NMOS transistor 422 and thereby initiate additional operation of the circuit 400. The first capacitor 402 and the first resistor 406 thereby implement the FIG. 2 slew rate detector 202, and the second NMOS transistor 420 and the third NMOS transistor 422 may be regarded as cooperating with the first capacitor 402 and the first resistor 406 to implement the slew rate detector 202.

The operation of the circuit portion of FIG. 4B may be further illustrated by reference to the circuit paths 1-8. Initially as shown by circuit path 1, the gates of the second and third NMOS transistors 420 and 422 receive a voltage (from the slew rate detector 202) at the first node 404 (net_nt). If the received voltage is sufficiently enabling, the second NMOS transistor 420 turns on, raising the voltage at the third node 416 to Vbst, thereby turning on the fourth NMOS transistor 424. Thus the slew rate detector 202 operates as a separate trigger to initiate operation of the amplifier 204. With both the third and fourth NMOS transistors 422 and 424 on, the voltage at the second node 410 (node_pad-pf) is pulled to $V_{SW}$ through the second resistor 407 as shown by circuit path 2. The value of the second resistor 407 may be selected in view of expected ESD events to limit Vbst to a value that does not exceed an AMR of the gate of the first PMOS transistor 408. The first PMOS transistor 408 is thus turned on as shown by circuit path 3. With the first PMOS transistor 408 on (circuit path 4), the first node 404 (net_nt) is pulled to Vbst by the (protected node) first input 120 and the second NMOS transistor 420 is maintained in an on-state for the duration of the time during which the ESD pulse on the first input 120 remains above the turned-on voltage of the second NMOS transistor 40 (circuit path 5).

Also with the second NMOS transistor 420 turned on, the first input 120 is conductively connected to the third node 416 (net_nh), and the second capacitor 418 is charged through the resistor 414 (circuit path 6). After a time determined by the resistance of the third resistor 414 and the capacitance of the second capacitor 418, net_nf between the resistor 414 and the second capacitor 418 reaches the turn-on voltage of the first NMOS transistor 412 and enables the first NMOS transistor 412 (circuit path 7). The first NMOS transistor 412 then pulls the first node 404 (net_nt) to $V_{SW}$ (circuit path 8), thereby stopping the current flow through the second, third, and fourth NMOS transistors 420, 422, and 424. An effect of these events is that the initial signal at the node 404 (net_nt) sourced by the slew rate detector (e.g., as implemented by the FIG. 4A first capacitor 402 and the first resistor 406) is amplified using the voltage Vbst, the amplified signal provided on the third node 416 (net_nh). Thus the components of FIG. 4B cooperate to implement the FIG. 2 amplifier 204, which renders the selective ESD shunt more sensitive and selective, so as to ensure ESD protective triggering and clamping at the desired detected rates of change of Vbst.

The net_nh/nf includes charging nodes for the second capacitor 418 and the third capacitor 438. Thus this net provides internal charge storage for the circuit 400. While the conducting second NMOS transistor 420 provides in part the above-described amplifier functionality, the current through circuit path 6 (FIG. 4B) charges the second capacitor 418, and a voltage from the second NMOS transistor 420 source (at the third node 416) is also coupled to and enables the sixth NMOS transistor 432 (see also FIG. 4C). Additionally, the third node 416 voltage charges the third capacitor 438, with the charge rate also potentially affected by the resistance of the sixth resistor 440 (see also FIG. 4D). In an example, the third capacitor 438 has a larger capacitance than the second capacitor 418, for example by a factor of 10, so that the third capacitor 438 will remain charged for a longer relative period, for example at least as long as the duration of an ESD event. In this regard, the stored charge across the third capacitor 438 implements the FIG. 2 one-shot 206, for the duration that such charge remains sufficient to enable the FIG. 2 clamp circuit 208. Accordingly, for the one-shot 206 duration, it maintains an enabling voltage at the third node 416. In part, the conductive path and resulting one-shot voltage also disables the prior amplification from the devices forming the amplifier 204, namely, the second capacitor 418 is charged, which enables the first NMOS transistor 412 (MN8) and thereby provides a discharge path to ground, for example which will then couple to ground current that is conducted through the second NMOS transistor 420.

The one-shot maintained voltage at the third node 416 enables one or more discharge paths between the first input 120 and the second input 122. In the FIG. 4 example, a first discharge path is through the fifth NMOS transistor 426, which has a source/drain path directly connected between those nodes. Accordingly, the fifth NMOS transistor 426, as a singularly enabled transistor, provides an adequate and relatively fast triggered shunt discharge for relatively low human body model (HBM) ESD stress. Further, a second and amplified discharge path is provided, while slightly delayed (e.g., a few nanoseconds) but with larger shunt capacity, by the combination of the second PMOS transistor 428 and the sixth and seventh NMOS transistors 432 and 436. Particularly, the third node 416 voltage enables the sixth NMOS transistor 432 and as a result the source/drain path of the sixth NMOS transistor 432 connects the gate of the second PMOS transistor 428 to the second input 122, thereby enabling the second PMOS transistor 428. As a result, the source/drain path of the second PMOS transistor 428 connects the first input 120 to the gate of the seventh NMOS transistor 436, which also is directly connected between the first input 120 and the second input 122. The NMOS transistor 436 may be a larger transistor, for example having a greater gate width than the NMOS transistor 426, allowing the NMOS transistor 436 to dissipate a greater current from the first input 120 without damage. In some examples the NMOS transistor 436 may have a gate width at least ten times larger than the gate width of the NMOS transistor 426, and in some implementations may have a gate width 50 times or greater than the NMOS transistor 426 gate width. Accordingly, the seventh NMOS transistor 436 provides an adequate shunt discharge for larger HBM ESD stress.

Figure 5A:
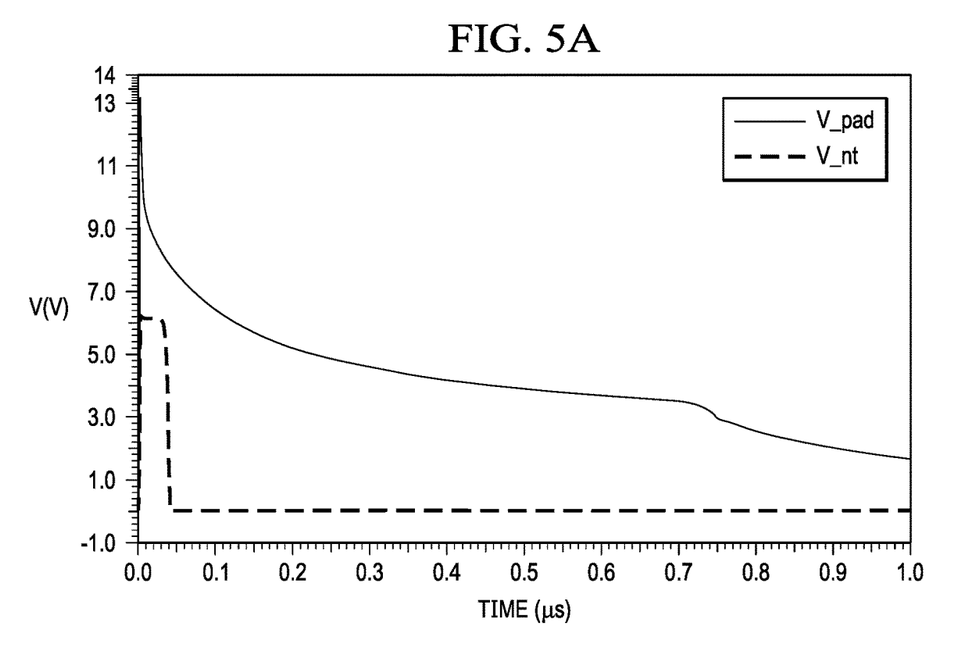
FIGS. 5A and 5B illustrate timing diagrams of voltages at various nets of the circuit of FIG. 4 in the event of a "medium-to-high" stress (e.g., 2.5 kV ESD stress) to a power terminal.
Figure 5B:
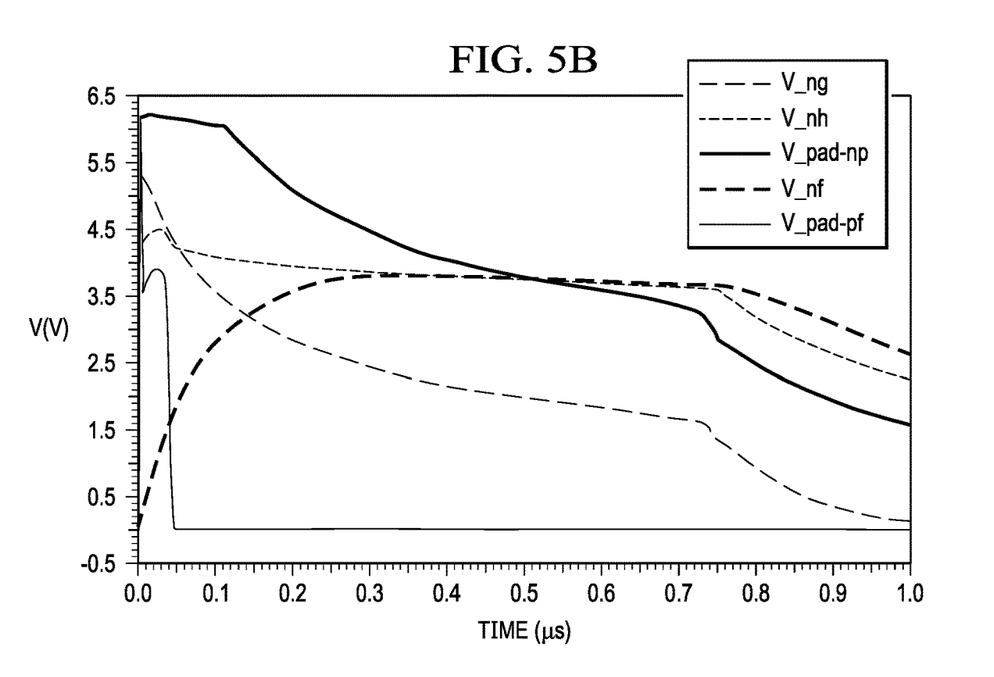

FIGS. 5A and 5B illustrate simulated voltages over time at various nodes in the circuit 400 according to one example. FIG. 5A includes two traces, V_pad at the first input 120 and V_nt at the first node 404. FIG. 5B includes five traces, V_ng at the first input 120, V_nh at the third node 416, V_pad-np at the gate of the second PMOS transistor 428, V of at the gate of the first NMOS transistor 412 and V_pad-pf at the second circuit node 410. The voltage traces reflect the simulated condition of the first input 120 (or pad) receiving a 2.5 kV HBM ESD event at t=0. This ESD event is an example of a medium/high stress event. Trace V_nt reflects the voltage at the first node 404, or the boosted trigger for the circuit 400. This node experiences a 6 V pulse that has a duration of about 40 ns. Trace V of shows the voltage on the charge storage net_nh that includes the second and third capacitors 418 ($C_2$) and 438 ($C_3$). This voltage trace is also the gate voltage of the low stress path between the inputs 120 and 122 through the fifth NMOS transistor 426, and the gate voltage of the medium/high stress discharge trigger sixth NMOS transistor 432.

As seen in FIG. 5B for the conditions of the medium/high stress operation, trace V_nh shows the voltage on the net_nh that provides the gate voltage to the low-stress fifth NMOS transistor 426 and the medium/high stress trigger sixth NMOS transistor 432. This trace is seen to initially reach a voltage of about 4.5 V for the duration of the boosted trigger signal, and then gradually decreases from about 4 V to about 3.5 V over the next 700 ns. Trace V_ng shows the voltage on the net ng that provides the gate voltage to the seventh NMOS transistor 436 in response to the voltage on the net_nh. The net ng initially increases to about 5.5 V, sufficient to turn on the sixth NMOS transistor 432, and decreases with an approximately exponential decrease to about 1.5 V with a time constant related to the capacitance on the charge storage net_nh. This results in the sixth NMOS transistor 432 initially conducting between the inputs 120 and 122 during the medium/high stress event, after which conduction through the low stress fifth NMOS transistor 426 is sufficient to completely discharge the ESD event. As a result of the combination of the discharge paths, the voltage at the first input 120 is limited to about 13 V under these conditions, well below a typically achievable AMR of the half-bridge power stage 100.

Figure 6A:
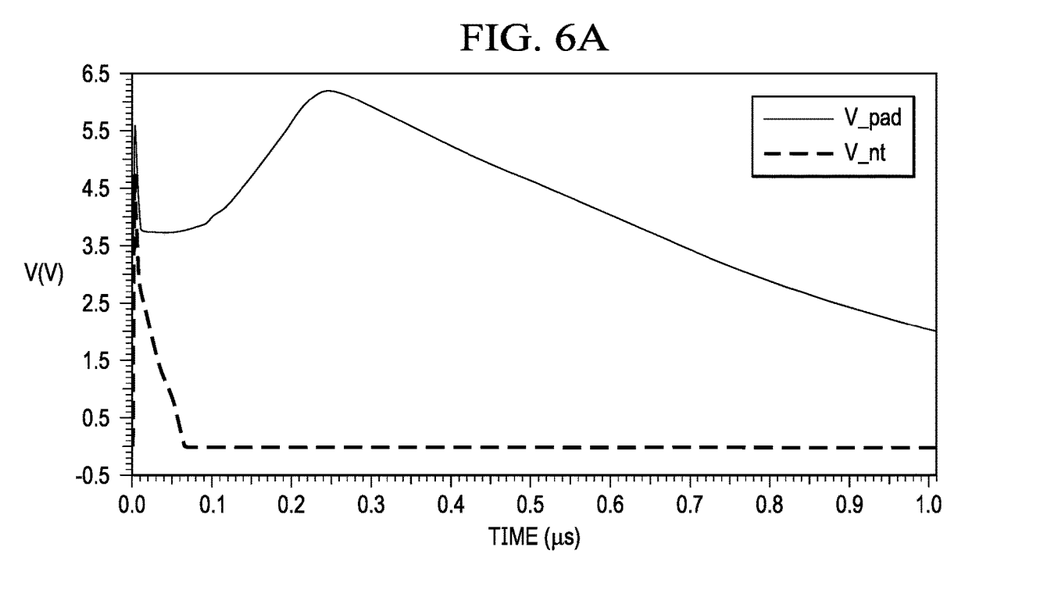
FIGS. 6A and 6B illustrate timing diagrams of voltages at various nodes of the circuit of FIG. 4 in the event of a "low" stress (e.g., 40 V ESD stress) to a power terminal.
Figure 6B:
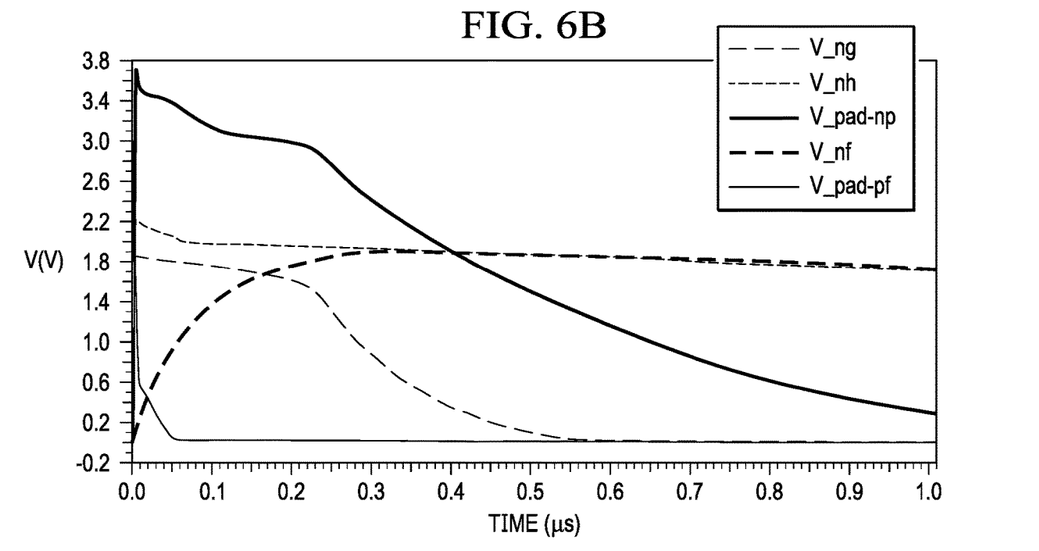

FIGS. 6A and 6B illustrate modelled voltages over time at the same nodes as shown in FIGS. 5A and 5B, but for the simulated condition of the first input 120 (or pad) receiving a 40 V HBM ESD event at t=0. This ESD event is an example of a low stress event. Traces corresponding to the seven nets are again shown, V_pad, V_nt, V_pad-np, V_nh, V_ng, V_nf and V_pad-pf. Trace V_pad shows that the pad (first input 120) voltage is limited to about 6.2 V. Trace V_nt (boosted trigger signal) experiences a 4.5 V spike with a duration at its peak of about 10 ns. Trace V_pad-np (the second PMOS transistor 428 gate node) has a maximum of about 3.5 V and decreases over a broader time range than the pad. The net_nh voltage (trace V_nh) remains at about 2 V over the simulated time frame, while the net ng voltage (trace V_ng) remains at about 1.8 V until 200 ns, and then decreases exponentially after the trace V_nf rises high enough to turn on the first NMOS transistor 412, which experiences an exponential increase to about 2 V at 300 ns and a gradual decline thereafter. Trace V_pad-pf qualitatively resembles trace V_pad, with a maximum of about 2.2 V. As a result of these interactions of the circuit 400 components, the pad voltage is limited to well below the AMR of the components of the half-bridge power stage 100.

Figure 7A:
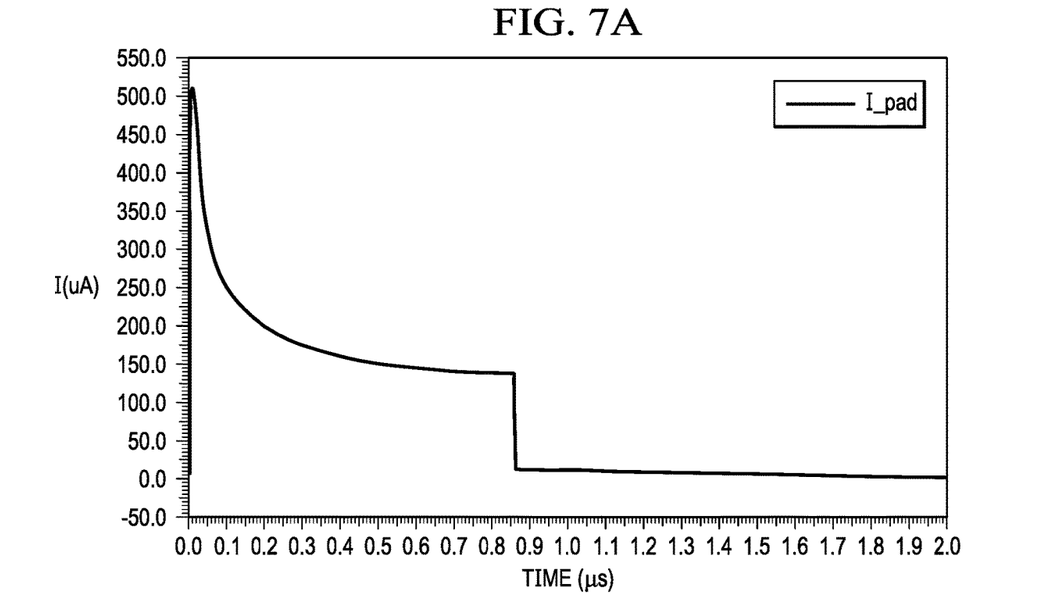
FIGS. 7A and 7B illustrates timing diagrams of current and voltage at various nodes of the circuit of FIG. 4 in the event of a power-up event of the circuit (e.g., with a voltage slew rate of 35V/µs at a power terminal).
Figure 7B:
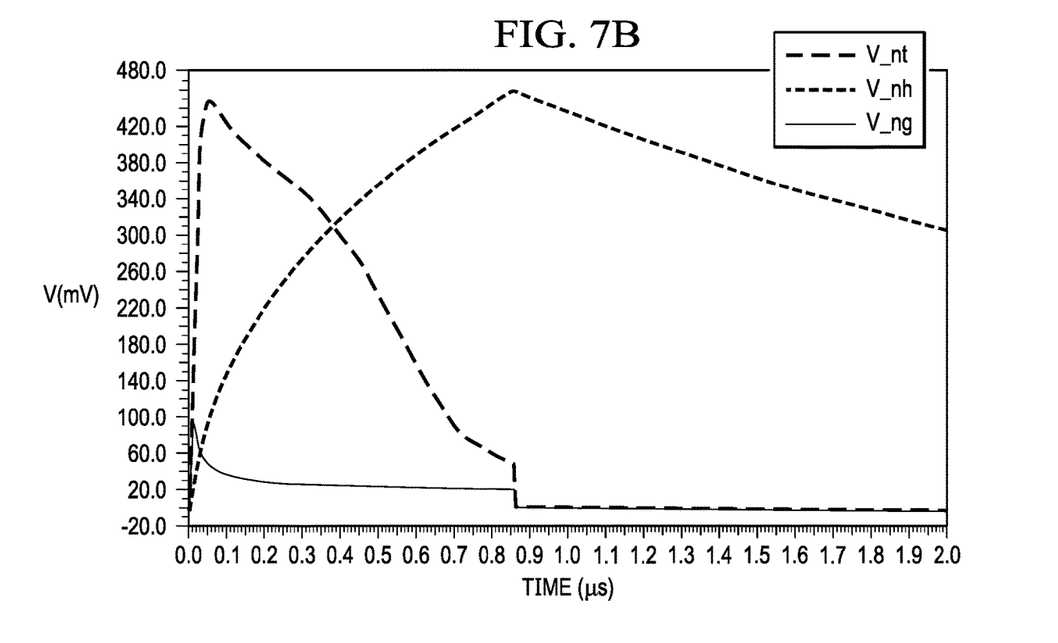

Finally, FIGS. 7A and 7B illustrate modelled electrical parameters over time at the relevant subset of the nodes shown in FIGS. 5A and 5B, but for the simulated condition of a startup condition of the half-bridge power stage 100 with a 35 V/µs power-up slew rate at the first input 120. The startup may be, for example, at the beginning of one phase of one cycle of an indefinitely repeating number of cycles of operation of the half-bridge power stage 100. FIG. 7A shows a trace I_pad with a vertical scale in µA, showing an initial current at the first input 120 of about 500 µA, and decreasing to about 150 µA by about 850 ns. This period may be representative of one period of operation of the high side of the half-bridge power stage 100 operating at about 588 kHz. Trace V_nt shows that the boosted trigger signal at the node 404 has a maximum voltage of about 450 mV at 50 ns after circuit start-up. The trace V_nh (low-stress gate voltage) reaches a maximum voltage of about 460 mV at 850 ns, while the trace V_ng (medium/high stress gate voltage) initially peaks at about 100 mV and exponentially decays to the end of the 850 ns phase. These data show that in under such conditions (e.g., in the absence of an ESD event of at least 40 V), neither the low-stress discharge path nor the medium/high stress discharge paths operates, allowing the half-bridge power stage 100 to operate normally.

The illustrated examples provide an IC with and ESD protected bootstrapped power supply. An example is shown as a half bridge power converter, while inventive aspects may be applied to other architectures. Examples may implement the ESD protection at startup or thereafter, or a startup protection may be disabled once a sufficiently stable operation is established. Further, these described examples may provide one or more of various benefits over prior ESD devices. For example, examples may provide protection to either high or low ESD spikes, in the event of a fast slew rate signal, while not triggering or introducing inrush currents during nominal power-up events. Examples also may be implemented without a static voltage level ESD trigger, at least as far as the bootstrap signal detection is concerned. Further, examples also may tolerate decoupling capacitance up to a certain limit, thereby avoiding the possible delay or operational slowdown from a higher capacitive implementation. Still further, examples may be implemented without external control at power-up and also can minimize so-called latch-up, that is, ESD triggering either at undesired times or under nominal conditions. As still another benefit, various inventive aspects can be implemented in a variety of configurations. Different levels of configuration details have been presented, and the inventive scope may include still others as contemplated or may be determined by one skilled in the art from the teachings of this document. Accordingly, additional modifications are possible in the described examples, and others are possible, within the scope of the following claims.

What is claimed is:

1. An integrated circuit (IC), comprising:
an ESD protection circuit coupled between a first rail supply node and a second rail supply node, the ESD protection circuit including:
a slew rate detector coupled between the first and second rail supply nodes;
an amplifier coupled to an output of the slew rate detector and configured to receive an input signal with a first slew rate and provide an output signal with a greater second slew rate;
a one-shot coupled to an output of the amplifier; and
a clamp circuit coupled to an output of the one-shot and configured to provide a low-resistance path between the first and second rail supply nodes responsive to the one-shot, the clamp circuit including a plurality of discharge paths, each discharge path in the plurality of discharge paths being operable to shunt a portion of an ESD signal received at the first rail supply node.

2. The IC of claim 1, wherein the slew rate detector includes a resistor having a resistance and a capacitor having has a capacitance, wherein the slew rate detector is configured to detect a slew rate of a voltage at one of the first rail supply node and the second rail supply node in response to a product of the resistance and the capacitance.

3. The IC of claim 1, wherein the clamp circuit includes first and second discharge paths, wherein the first discharge path is operable to shunt a first current magnitude and the second discharge path is operable to shunt a different second current magnitude.

4. An integrated circuit (IC), comprising:
a first rail supply;
a second rail supply, wherein the first rail supply and the second rail supply are adapted to be coupled to a capacitor between the first rail supply and the second rail supply; and
an ESD protection circuit coupled to at least one of the first rail supply and the second rail supply, the ESD protection circuit including:
a slew rate detector coupled to at least one of the first rail supply and the second rail supply;
an amplifier coupled to an output of the slew rate detector and configured to receive an input signal with a first slew rate and provide an output signal with a greater second slew rate;
a one-shot coupled to an output of the amplifier; and
a clamp circuit coupled an output of the one-shot, the clamp circuit including a plurality of discharge paths, each discharge path in the plurality of discharge paths being operable to shunt a portion of an ESD signal received at the first rail supply.

5. The IC of claim 4 wherein the capacitor is a bypass capacitor.

6. The IC of claim 4 wherein the capacitor is a bootstrap capacitor.

7. The IC of claim 4, wherein the slew rate detector includes a resistor having a resistance and a capacitor having a capacitance, wherein a product of the resistance and the capacitance establishes a time constant limit for detecting a slew rate of a signal at the at least one of the first rail supply and the second rail supply.

8. The IC of claim 4, wherein each discharge path in the plurality of discharge paths is operable to shunt a portion of an ESD signal received at the at least one of the first rail supply and the second rail supply.

9. The IC of claim 4, wherein each discharge path in the plurality of discharge paths is operable to shunt a different amount of an ESD signal received at the at least one of the first rail supply and the second rail supply.

10. The IC of claim 4 and further including a power output, wherein the ESD protection circuit is coupled between the power output and at least one of the first rail supply and the second rail supply.

11. An electrostatic discharge (ESD) protected circuit, comprising:
an integrated circuit (IC);
a capacitor coupled to the IC; and
an ESD protection circuit coupled to a terminal of the capacitor, the ESD protection circuit including:
a slew rate detector coupled to the terminal of the capacitor;
an amplifier coupled to an output of the slew rate detector and configured to receive an input signal with a first slew rate and provide an output signal with a greater second slew rate;
a one-shot coupled to an output of the amplifier; and
a clamp circuit coupled an output of the one-shot and including a plurality of discharge paths, each discharge path in the plurality of discharge paths being operable to shunt a portion of an ESD signal received at the terminal of the capacitor.

12. The ESD protected circuit of claim 11 wherein the IC includes a high-side IC, and further including a low-side IC.

13. The ESD protected circuit of claim 12 wherein the capacitor is coupled to the high-side IC and to the low-side IC.

14. The ESD protected circuit of claim 13:
wherein the low-side IC is operable in a first cycle to couple a charging voltage to the capacitor; and
wherein the capacitor is operable to provide a boost voltage to the high-side IC operable in a second cycle, differing from the first cycle.

15. The ESD protected circuit of claim 11, wherein the capacitor is a first capacitor, and the slew rate detector includes a resistor having a resistance and a second capacitor having a capacitance, wherein a product of the resistance and the capacitance establishes a time constant limit for detecting a slew rate of a signal at the terminal of the first capacitor.

16. The ESD protected circuit of claim 11, wherein each discharge path in the plurality of discharge paths is operable to shunt a different amount of an ESD signal received at the terminal of the capacitor.

17. The ESD protected circuit of claim 11, wherein the terminal is a first terminal, and the ESD protection circuit is coupled to the first terminal and a second terminal of the capacitor.

18. An electrostatic discharge (ESD) protected circuit, comprising:
an integrated circuit (IC);
a capacitor coupled to the IC; and
an ESD protection circuit coupled to a terminal of the capacitor, the ESD protection circuit including:
a slew rate detector coupled to the terminal of the capacitor;

an amplifier coupled to an output of the slew rate detector and configured to receive an input signal with a first slew rate and provide an output signal with a greater second slew rate;
a one-shot coupled to an output of the amplifier; and
a clamp circuit coupled an output of the one-shot and including a plurality of discharge paths, each of the discharge paths in the plurality of discharge paths being operable to shunt a different amount of an ESD signal received at the terminal of the capacitor.

* * * * *